United States Patent
Tahara et al.

(10) Patent No.: US 8,658,722 B2
(45) Date of Patent: Feb. 25, 2014

(54) AQUEOUS SURFACE-TREATING AGENT

(75) Inventors: Masaki Tahara, Ibaraki (JP); Tetsuhiro Kitahara, Ibaraki (JP); Toshihiro Higashira, Kanagawa (JP); Yoshifumi Kojima, Kanagawa (JP)

(73) Assignees: NOK Klueber Co., Ltd., Tokyo (JP); NOK Corporation, Tokyo (JP)

( * ) Notice: Subject to any disclaimer, the term of this patent is extended or adjusted under 35 U.S.C. 154(b) by 317 days.

(21) Appl. No.: 12/681,919

(22) PCT Filed: Jul. 18, 2008

(86) PCT No.: PCT/JP2008/062994
§ 371 (c)(1),
(2), (4) Date: Apr. 7, 2010

(87) PCT Pub. No.: WO2009/047938
PCT Pub. Date: Apr. 16, 2009

(65) Prior Publication Data
US 2010/0222475 A1    Sep. 2, 2010

(30) Foreign Application Priority Data

Oct. 9, 2007   (JP) ................................. 2007-263457
Jun. 24, 2008  (JP) ................................. 2008-164431

(51) Int. Cl.
*C08K 5/24*    (2006.01)
*C08K 5/1515*  (2006.01)

(52) U.S. Cl.
USPC ........................... 524/262; 524/114; 524/264

(58) Field of Classification Search
USPC .......................................... 524/114, 262, 264
See application file for complete search history.

(56) References Cited

U.S. PATENT DOCUMENTS 4,839,443 A * 6/1989 Akutsu et al. ................. 525/474
5,376,454 A * 12/1994 Sugasawa et al. ............ 428/421

FOREIGN PATENT DOCUMENTS

| JP | 61-138639 | 6/1986 |
| JP | 07-233347 | 9/1995 |
| JP | 08-045070 | 2/1996 |
| JP | 09012864 A | * 1/1997 |
| JP | 10-291377 | 11/1998 |
| JP | 2000-063744 | 2/2000 |
| JP | 2005-125656 | 5/2005 |
| JP | 2006-299274 | 11/2006 |

OTHER PUBLICATIONS

A machine translation of JP2005-125656A.*
Machine translation of JP09012864, 1997.*
English translation of the International Preliminary Report on Patentability (Chapter I) and Written Opinion dated May 14, 2010, 6 pages.
International Search Report from corresponding PCT application No. PCT/JP2008/062994, dated Oct. 28, 2008, 4 pages.

* cited by examiner

*Primary Examiner* — Aiqun Li
(74) *Attorney, Agent, or Firm* — Brinks Gilson & Lione

(57) ABSTRACT

An aqueous surface-treating agent, which comprises a silicone oil aqueous emulsion, a polyurethane resin aqueous emulsion, and a silane compound represented by the following general formula (A)

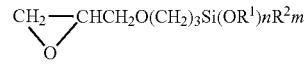

(B)

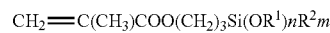

(C)

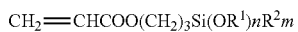

(D)

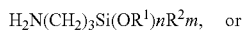

(E)

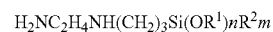

(where $R^1$ and $R^2$ each are an alkyl group having 1 to 4 carbon atoms, and n and m are $1 \leq n \leq 3$ and $m=3 \cdot n$, respectively), and/or a hydrolyzate thereof, wherein 100 parts by weight or more of the polyurethane resin in terms of the weight of solid matters is used on the basis of 100 parts by weight in terms of nonvolatile matters of silicone oil, can prevent sticking of rubber seal materials such as O rings, etc. themselves or sticking to a metal, a resin, etc., and can reduce the friction of rubber or resin seal members at the time of sliding motion.

8 Claims, No Drawings

AQUEOUS SURFACE-TREATING AGENT

RELATED APPLICATION

This application is a 35 U.S.C. §371 national phase filing of International Patent Application No. PCT/JP2008/062994, filed Jul. 18, 2008, through which and to which priority is claimed under 35 U.S.C. §119 to Japanese Patent Application Nos. 2007-263457, filed Oct. 9, 2007 and 2008-164431, filed Jun. 24, 2008.

TECHNICAL FIELD

The present invention relates to an aqueous surface-treating agent, and more particularly to an aqueous surface-treating agent effectively applicable to surfaces of rubber seal materials, etc.

BACKGROUND ART

Most of now available rubber seal materials suffer from sticking problems between seal materials themselves or sticking to contact surfaces of mating materials such as metals, resins, etc., when assembled into equipment. To overcome such problems, a liquid material such as wax, grease, lubricating oil, etc. is applied to the seal materials, thereby improving the assembling work.

When rubber parts such as O rings, etc. are transported by a parts feeder to conduct automatic assembling, the more the liquid material is applied, the lower the friction coefficient, but blocking of the parts themselves will occur due to sticking of the applied liquid material, thereby bringing about an inconvenience to the automatic feeding of the parts. To reduce the sticking occurrence, on the other hand, the less the liquid material to be applied, the more often the liquid material is liable to deposit onto the surroundings, thereby causing the blocking. The applied liquid material is liable to come off due to the liquid nature, and thus its retainability is not sufficient. Furthermore, it is difficult to control the application amount of the liquid material, and thus it is difficult to obtain the rubber parts in a stable state only by the liquid material. Blocking as well as sticking can be prevented by spraying inorganic powders of graphite, silica, talc, etc., but surrounding pollution due to disengagement of the deposited powders is inevitable.

To overcome such problems, Patent Document 1 proposed a surface-treating agent, which comprises (1) a reaction product of polysiloxane having a terminal hydroxyl group, with silyl isocyanate, (2) a reaction product of an oligomer having a functional group reactive with an isocyanate group, with silyl isocyanate, (3) a silyl isocyanate oligomer represented by the following general formula:

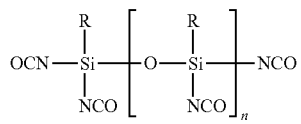

(R: an alkyl group, an aryl group, or an isocyanate group, and n: an integer of 1 or more), and (4) an organic solvent-soluble rubber. The assembling work and stickiness can be improved by such a surface-treating agent, but the major component of the surface-treating agent is an organic solvent such as toluene, ethyl acetate, methyl ethyl ketone, etc., which can also lead to such problems as a high environmental load and a difficult handling.

Patent Document 1: JP-A-2000-63744

Patent Document 2 proposes an aqueous mold-releasing agent composition for use upon application to the surface of a mold, which comprises (A) a silicone emulsion, (B) a urethane resin-based aqueous emulsion, and (C) a silane compound having at least one of epoxy group and methacryloxypropyl group at the molecular chain terminal, and/or a partial hydrolyzate thereof. Such a composition has a low environmental load due to the aqueous system, but has a problem of surrounding pollution due to bleeding of oily matters onto the surface after application and drying, when used as a surface-treating agent for the sliding members, which is the object of the present invention, because the aqueous emulsion containing a polyhydrazide and a carbonyl group-containing polyurethane•vinyl•hybrid polymer is used as Component (B). Furthermore, tight adhesion to the rubber materials is not satisfactory, resulting in short durability and easy peeling. Thus, the proposed composition is not preferable.

Patent Document 2 JP-A-2005-125656

DISCLOSURE OF THE INVENTION

Problem to be Solved by the Invention

The object of the present invention is to provide an aqueous surface-treating agent capable of preventing sticking between rubber seal materials such as O rings, etc. themselves or sticking to metals, resins, etc., and reducing friction of rubber or resin seal members at the time of sliding motion.

Means for Solving the Problem

The object of the present invention can be attained by an aqueous surface-treating agent, which comprises a silicone oil aqueous emulsion, a polyurethane resin aqueous emulsion, and a silane compound represented by the following general formula:

(A) 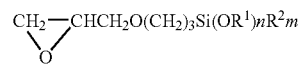

(B) $CH_2 = C(CH_3)COO(CH_2)_3Si(OR^1)_nR^2_m$ (C) $CH_2 = CHCOO(CH_2)_3Si(OR^1)_nR^2_m$ (D) $H_2N(CH_2)_3Si(OR^1)_nR^2_m$, or (E) $H_2NC_2H_4NH(CH_2)_3Si(OR^1)_nR^2_m$ (where $R^1$ and $R^2$ each are an alkyl group having 1-4 carbon atoms, n and m are $1 \leq n \leq 3$ and $m = 3-n$, respectively), and/or a partial hydrolyzate thereof, wherein 100 parts by weight or more, preferably 100-2,000 parts by weight, of the polyurethane resin in terms of the weight of solid matters is used on the basis of 100 parts by weight in terms of the weight of nonvolatile matters of the silicone oil.

Effect of the Invention

The present surface-treating agent has such features as a low environmental load owing to the nature of an aqueous system and a good applicability without any special equipment. Furthermore, the tight adhesion to substrates can be attained without any bleeding of oily matters by making the total polyurethane resin content higher than the silicone oil content, whereby a distinguished durability can be obtained. As a result, sticking between rubber materials such as O rings themselves or sticking to metals, resins, etc. can be effectively prevented, and furthermore friction of rubber or resin seal members can be reduced at the time of sliding motion.

When a mixture of (a) an aqueous emulsion containing a hydrazide and a carbonyl group-containing polyurethane resin and (b) an aqueous emulsion of a silanol-modified polyurethane resin is used as the polyurethane resin, the solvent resistance can be also improved in addition to the afore-mentioned features.

BEST MODES FOR CARRYING OUT THE INVENTION

The silicone oil for use in the present invention includes an organopolysiloxane having at least one organic group bonded to the silicon atom and having a kinematic viscosity at 25° C. of 50-1,000,000 mm$^2$/sec., preferably 500-200,000 mm$^2$/sec., where its molecular structure can be any of linear, branched or reticular structures, preferably linear or branched one, more preferably linear one. The organic group bonded to the silicon atom of organopolysiloxane is typically an alkyl group such as methyl, ethyl, propyl, butyl, or hexyl; an alkenyl group such as vinyl, or propenyl; an aryl group such as phenyl; an aralkyl group such as phenethyl; and those hydrocarbon groups, some of whose hydrogen atoms are substituted by a halogen atom, a nitrile group, etc. The terminal organic group of organopolysiloxane is typically methyl, amino, epoxy, carbinol, hydroxyl, methoxy, methacryloxy, carboxyl, silanol, alkoxy, etc., and preferably carbinol, hydroxyl or methoxy. The silicone oil can give a lubricability, a low friction, and a non-stickiness to the surface-treatment film.

The aqueous emulsion containing such a silicone oil for use in the present invention includes not only a hydrophilic type silicone oil aqueous emulsion, but also an emulsifier-forced emulsion type silicone oil aqueous emulsion, where their dispersion method is not particularly limited. Such silicone oil aqueous emulsions have a silicone oil content (non-volatile matters) of 3-60 wt.%.

The silicone oil aqueous emulsion is admixed with a pre-determined amount of a polyurethane resin aqueous emulsion. Polyurethane resin (solid matters) is added to the silicone oil aqueous emulsion in a proportion of 100 parts by weight or more, preferably 100-2,000 parts by weight, on the basis of 100 parts by weight of silicone oil (nonvolatile matters) of the silicone oil aqueous emulsion. When the polyurethane resin is used in a proportion of less than 100 parts by weight, the coatability will be lowered, and bleeding of silicone oil will occur to lower the durability. Thus, this is not preferable.

The polyurethane resin aqueous emulsion includes a self-emulsification type having hydrophilic groups as introduced into the polyurethane structure, a forced emulsification type emulsified by an emulsifier, etc., where any type of polyurethane molecular structure, such as ether polyol type, ester polyol type, polycarbonate type, etc. can be used without any particular limitation. It is preferable to use an aqueous emulsion containing a hydrazide and a carbonyl group-containing polyurethane resin as a self cross-linkable type polyurethane, and more preferable to use a mixture thereof further with a silanol-modified polyurethane resin aqueous emulsion or with a self cross-linkable group-free polyurethane resin aqueous emulsion, particularly preferably a mixture thereof further with a silanol-modified polyurethane resin aqueous emulsion. In the case of the mixture thereof further with the silanol-modified polyurethane resin aqueous emulsion, it is preferable to prepare the mixture upon mixing in a ratio by weight of solid matter sum total of the aqueous emulsion containing a hydrazide and carbonyl group-containing polyurethane resin:silanol-modified polyurethane resin=5-90:95-10. In the case of the mixture thereof further with the self cross-linkable group-free polyurethane resin aqueous emulsion, the same solid matter ratio by weight as mentioned above can be used.

The self cross-linkable type polyurethane has more distinguished solvent resistance, tight adhesion, and stability than those of the self cross-linkable group-free polyurethane resin, and thus even in the case of using only the aqueous emulsion containing a hydrazide and a carbonyl group-containing polyurethane resin, the afore-mentioned characteristics can be fully obtained by making total content of polyurethane resin higher than the silicone oil content. The silanol-modified, self cross-linkable type polyurethane can attain much higher levels of solvent resistance and tight adhesion. Thus, a polyurethane resin aqueous emulsions surface-treating agent comprising a mixture of these components can reduce the friction of rubber or resin seal members at the time of sliding motion, and also can improve the solvent resistance. The silanol groups as contained therein have a good compatibility with silicone oil and silane compound as constituents of the aqueous surface-treating agent. This is another advantage of using the silanol-modified polyurethane resin aqueous emulsion.

The aqueous emulsion containing a hydrazide and a carbonyl group-containing polyurethane resin includes an aqueous emulsion containing a hydrazide and a carbonyl group-containing polyurethane•vinyl•hybrid polymer, as disclosed in Patent Documents 3 and 4, where the azomethine bonds formed by reaction of the hydrazide with the carbonyl group of polyurethane-vinyl-hybrid polymer can lead to cross-linking. In this case, these two compounds can be used generally in a proportion of the number of hydrazine groups to the number of carbonyl groups of 1:40-2:1.

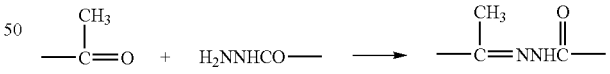

The hydrazide includes hydrazine, lower molecular weight aliphatic compound, aromatic compound or mixture thereof having a hydrazide group and/or a hydrazone group, and further includes a polyhydrazide or a polyvalent hydrazide compound having at least two of these groups. The polyurethane-vinyl-hybrid polymer can be prepared by free radical-initiated polymerization of an ionically and/or nonionically stabilized polyurethane macromonomer having a terminal vinyl group and/or side chain vinyl group, and in some cases a terminal hydroxyl group, a urethane group, a thiourethane group or a urea group, with other functional vinyl monomer having a carbonyl group, and a non-functional vinyl monomer. For such aqueous emulsion, commercially available products, such as DAOTAN VTW6462/36WA, a product of Japan Thytec Industries, DAOTAN series, products of Solucia Japan, etc. can be practically used, as described in aforementioned Patent Document 2.

Patent Document 3: JP-A-7-233347
Patent Document 4: JP-A-2006-299274

The silanol-modified polyurethane resin aqueous emulsion is an aqueous dispersion containing silanol groups in the polyurethane structure, where the silanol groups turn to siloxane bonds by condensation cross-linking reaction

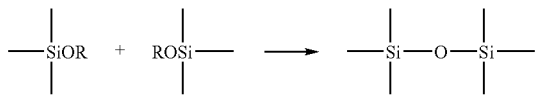

The siloxane bonds are stable, as compared with bonds formed by other urethanization cross-linking reaction, and thus the resulting surface treatment film has such an effect as a good solvent resistance. The polyurethane resin aqueous emulsion can give a sliding durability to the surface treatment film, and further can take the silicone oil therein to give a lubricability, a low frictional resistance, and a non-stickiness, without any bleeding the oil matters to the surface treatment film. The silano-modified polyurethane resin aqueous emulsion for use herein has a resin concentration of 10-70 wt.% in terms of solid matters.

The silane compound for use herein includes silane compounds represented by the following general formula

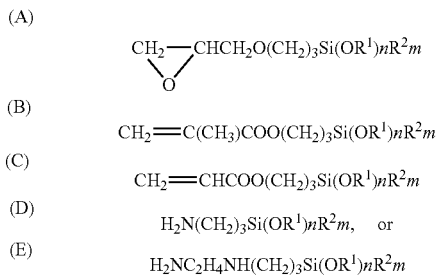

($R^1$, $R^2$: an alkyl group having 1-4 carbon atoms, n, m: $1 \leq n \leq 3$, m=3-n). These silane compounds are components capable of holding the silicone oil within the surface treatment film by reaction of the reactive organic groups of the silicone emulsion with the alkoxy groups of the afore-mentioned specific silane compounds, and capable of giving a lubricability, a low friction resistance, and a non-stickiness of the surface, without any bleeding the oily matters, and also reacting with the polyurethane aqueous emulsion to improve the affinity between cross-linked polyurethane resin and the silicone oil to retain the silicone oil within the surface treatment film. Furthermore, these silane compounds can act to improve the coatability on a substrate to be surface treated.

Such silane compounds include, for example, γ-glycidoxypropyltrimethoxysilane, γ-glycidoxypropyltriethoxysilane, γ-glycidoxypropyltripropoxysilane, γ-glicidoxypropylmethyldimethoxysilane, γ-glycidoxypropylmethyldiethoxysilane, γ-glicidoxypropylmethyl-dipropoxysilane, silane compounds A); γ-methacryloxypropyltrimethoxysilane, γ-methacryloxypropyltriethoxysilane, γ-methacryloxy-propyltripropoxysilane, γ-methacryloxypropylmethyldimethoxysilane, γ-methacryloxypropylmethyldiethoxysilane, γ-methacryloxypropylmethyl-dipropoxysilane (i.e. silane compound B); 3-acryloxypropylmethyl-dimethoxysilane, 3-acryloxypropylmethyldiethoxysilane, 3-acryloxypropyl-triethoxysilane (i.e. silane compounds C); 3-aminopropyltrimethoxysilane, 3-aminopropyltriethoxysilane (i.e. silane compounds D); and N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-(2-aminoethyl-aminopropylmethyldimethoxysilane silane compounds E), among which γ-glycidoxypropyltrimethoxysilane, γ-glycidoxypropylmethyldimethoxysilane, γ-methacryloxypropyltrimethoxysilane, γ-methacryloxypropylmethyldimethoxysilane, etc. can be preferably used.

Partial hydrolyzates of these silane compounds can be also used in the present invention. The hydrolyzates can be obtained by condensation reaction of one of the silane compounds or a mixture of two or more thereof, under hydrolysis conditions depending on the species of the selected silane compounds.

It is preferable to add 10-60 parts by weight of the silane compound to 100 parts by weight of oily matters (nonvolatile matters) of silicone oil emulsion. When the silane compound is used in a proportion of more than 60 parts by weight, the friction coefficient will be increased, and the durability will be lowered, whereas in a proportion of less than 10 parts by weight, excess bleeding of oil will occur.

To prevent thread-forming spinnability or partial liquid gathering, thereby stopping occurrence of a potted coating or short coating amount, the surface-treating agent comprising above-mentioned, essential components can contain an amphoteric surfactant such as alkylamine oxide-based compounds, alkyl betaine, etc. The alkylamine oxide-based compounds include dimethylalkylamine oxide, etc., and the alkyl betaine includes alkyldimethylaminoacetic acid betaine, etc., where the alkyl group includes, for example, lauryl group, myristyl group, natural oil-e groups derived from coconut oil, etc. The alkylamine oxide-based compound or the alkyl betaine can be used in a proportion of 10 wt. % or less on the basis of total composition.

The surface-treating agent can further contain a defoaming agent, a pigment, inorganic powders, a thickening agent, a surfactant, etc., if required. The composition is used upon dilution with water to a concentration of the effective components to 0.1-40 wt. % from the viewpoint of coating efficiency and coatability. These compounding ingredients are used upon mixing and emulsification treatment with sufficient stirring. The mixing can be carried out by a well-known mixer-stirrer, etc. provided with stirring blades of paddle type, anchor type, etc., and the emulsification treatment can be carried out by an emulsifying dispersing device such as a colloid mill, a homo-mixer, a homogenizer, a combi mix, a sand grinder, etc.

The surface-treating agent so prepared can be subjected to surface treatment by applying it to the surface of a member to be coated by immersion, brush coating, roll coating, spray coating, knife coating, dip coating, etc., followed by heat drying at 120-150° C. for 30-60 minutes to form a cured film.

The present surface-treating agent can be effectively used for rubber materials such as fluororubber, NBR, hydrogenated NBR, SBR, isoprene rubber, butadiene rubber, chloroprene rubber, acrylic rubber, EPDM, urethane rubber, silicone rubber, etc., or for resin materials such as thermoplastic resins, thermosetting resins, etc., for example, ABS, AS, etc.

EXAMPLES

The present invention will be described in detail below, referring to Examples.

Example 1

| | Parts by weight |
|---|---|
| Both terminal hydroxyl groups-containing emulsion polymerization polydimethylsiloxane aqueous emulsion (viscosity at 25° C.: 100,000 mPa·sec; nonvolatile matters: 33%) | 4.07 (1.34) |
| Hydrazide and carbonyl group-containing polyurethane resin aqueous emalsion (solid matters: 36 wt. %; Daotan VTW 6462/36WA) | 2.71 (0.98) |
| Silanol-modified polyurethane resin aqueous emulsion (solid matters: 30 wt. %; Tackelack WS-5000, a product of Mitsui Chemical Polyurethane Co.) | 6.67 (2.00) |
| γ-glycidoxypropyltrimethoxysilane | 0.68 |
| Dimethyllaurylamine oxide (amphoteric surfactant) | 0.45 |
| Water | 85.42 |

The foregoing components (figures in the parentheses show weights of solid matters) were mixed together, and further subjected to emulsification treatment by a homogenizer and an ultrasonic treating unit to obtain a surface-treating agent. The resulting surface-treating agent had 2.98 parts by weight of total polyurethane resins, which corresponded to 222.3 parts by weight on the basis of 100 parts by weight of silicone oil (in terms of nonvolatile matters, as will be likewise used hereinafter).

Then, the surface-treating agent was applied to a fluororubber sheet and a fluororubber O ring (hardness: JIS A70°, dimensions: 7.8 mm in inner diameter, 1.9 mm in thickness (diameter), and nominal number: JIS B 2401-4 grade D P8 by spray costing method), and then cured at 150° C. for 30 minutes to obtain the coated fluororubber sheet and O ring each having a coating film as formed thereon to a film thickness of about 2 μm.

The surface-treated fluororubber sheet having a thickness of 2 mm or O ring was subjected to determination and tests according to the following test items:

Friction coefficient: According to ASTM D-1894 determine kinematic friction coefficient of surface-treated, vulcanized rubber sheet surface by using a surfaceness tester, Heydon tribogear, made by Shinto Scientific Co.

(Test Conditions)
Mating member: SUS304 steel ball, 10 mm in diameter
Moving speed: 50 mm/min.
Load: 0.49N
Amplitude: 50 mm Durability test: To conduct a test under the following conditions, using a Heydon tribogear, and then evaluate the tested film states according to the following ranking:

No peeling: ○
Partial exposure of the substrate: X
(Test Conditions)
Mating member: SUS304 steel ball, 10 mm in diameter
Moving speed: 400 mm/min.
Load: 0.98N
Amplitude: 30 mm by 500 runs Non-stickiness test: To conduct a test by sandwiching the surface-treated fluororubber O ring between SUS430 members, followed by heating in a thermostat tank at 150° C. in a 50% compressed state for 30 minutes, leaving to stand at room temperature for one hour, releasing the O ring from the SUS members, and then to evaluate the releasing state according to the following ranking:

Immediately releasable from the mold without any trouble: ○

Sticky right after the leasing operation, but releasable from the mold one minute thereafter: Δ

Sticky or peeling by transfer to the SUS members: X

Solvent resistance test: To immerse the surface-treated fluororubber O ring into toluene for 24 hours, then conduct as ultrasonic washer treatment for 10 minutes, while keeping the O ring as immersed in toluene, then taking it out of the toluene, and evaluate the film state according to the following ranking:

Neither dissolution nor peeling of the film: ○

Neither dissolution nor peeling, but whitening of the film: Δ

Observation of either dissolution or peeling of the film: X

Bleeding evaluation: To apply the surface-treating agent to a rubber sheet, followed by drying, and evaluate the surface state of the surface-treated rubber sheet according to the following ranking:

No bleeding of oily matters to the surface: ○
Bleeding of oil matters to the surface: X Pot life test: To leave a surface-treating agent solution having a solid matter concentration of 10 wt. % to stand in the circumstance at the liquid temperature of 25° C. and the humidity of 70% for 72 hours and evaluate formation of precipitates in the solution by visual observation according to the following ranking:

No observation of precipitates: ○
Observation of precipitates: X

Coatability test: To visually observe the coating film state of surface-treated fluororubber sheet to evaluate according to the following ranking:

Uniform coating without any unevenness: ○

Uneven coating without uniform coating: X Evaluation of O ring transporting characteristics by parts feeder: To transport 500 surface-treated fluororubber O rings by a parts feeder, and count the number of passed O rings per hour (transport rate) and the number of O rings remaining on the parts feeder, where the more the passed O rings number, the higher the transport rate, and the blocked O rings remain on the parts feeder

Example 2

In Example 1, the same amount of γ-methacryloxypropyltrimethoxysilane was used in place of γ-glycidoxypropyltrimethoxysilane. The resulting surface-treating agent had 2.98 parts by weight of total polyurethane resins, which corresponded to 222.3 parts by weight on the basis of 100 parts by weight of silicone oil.

Example 3

In Example 1, the same amount of a self-cross-linking group-free polyurethane resin aqueous emulsion (solid matters: 30 wt. %; TACKELACK W-6061, a product of Mitsui Chemical Polyurethane Co.) was used in place of the silanol-modified polyurethane resin aqueous emulsion. The resulting surface-treating agent had 2.98 parts by weight of total polyurethane resins, which corresponded to 222.3 parts by weight on the basis of 100 parts by weight of silicone oil.

Example 4

In Example 1, the silanol-modified polyurethane resin aqueous emulsion was excluded from use, and the amount of the hydrazide and carbonyl group-containing urethane resin aqueous emulsion was changed to 8.28 (2.98) parts by weight. The resulting surface-treating agent had 2.98 parts by weight of total polyurethane resins, which corresponded to 222.3 parts by weight on the basis of 100 parts by weight of silicone oil.

Comparative Example 1

In Example 1, the following components were used for a surface-treating agent

|  | Parts by weight |
|---|---|
| Both terminal hydroxyl groups-containing, emulsion polymerization polydimethylsiloxane aqueous emulsion (nonvolatile matters: 33%) | 2.30 (0.76) |
| Hydrazide and carbonyl group-containing polyurethane resin aqueous emulsion (solid matters: 36 wt. %) | 1.55 (0.56) |
| γ-glycidoxypropyltrimethoxysilane | 0.40 |
| Dimethyllaurylamine oxide | 0.75 |
| Water | 95.00 |

The resulting surface-treating agent had 0.56 parts by weight of total polyurethane resins, which corresponded to 73.5 parts by weight on the basis of 100 parts by weight of silicone oil.

Comparative Example 2

In Comparative Example 1, the same amount of γ-methacryloxypropyltrimethoxysilane was used in place of the γ-glycidoxypropyltrimethoxysilane. The resulting surface-treating agent had 0.56 parts by weight of total polyurethane resins, which corresponded to 73.5 parts by weight on the basis of 100 parts by weight of silicone oil.

Comparative Example 3

In Comparative Example 1, neither hydrazide and carbonyl group-containing polyurethane resin aqueous emulsion, nor γ-glycidoxypropyltrimethoxysilane, and dimethyllaurylamine oxide was used at all.

Comparative Example 4

In Example 1, no surface treatment was carried out at all.

The results obtained in the foregoing Examples and Comparative Examples are shown in the following Table.

It can be seen from the foregoing results that in the cases of low friction coefficient without any stickiness there are such tendencies that blocking and number of remaining O rings will be smaller, and the transport rate will be higher, whereas in the case of application of only silicone oil or higher silicone oil content, stickiness will be increased though the friction coefficient is lowered, resulting in blocking of O rings themselves, and slower transport rate.

INDUSTRIAL UTILITY

The present aqueous surface-treating agent can be effectively used for the surface treatment of seal materials such as O rings, oil seals, V rings, D rings, X rings, packings, etc., automobile sliding rubber such as weather strips, wiper blades, etc., business machine rubber materials such as toner blades, rubber rolls, etc., resin gears for use in automobiles, business machines, etc., and sliding members such as paper-feeding resin clicks for printers, etc.

The invention claimed is:

1. An aqueous surface-treating agent, which comprises a silicone oil aqueous emulsion, a polyurethane resin aqueous emulsion, and a silane compound represented by the following general formula:

(A)

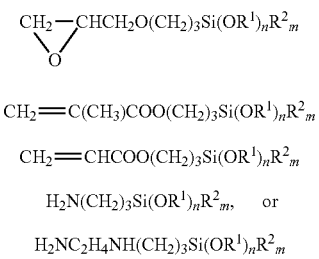

(B)

$$CH_2={=}C(CH_3)COO(CH_2)_3Si(OR^1)_nR^2_m$$

(C)

$$CH_2={=}CHCOO(CH_2)_3Si(OR^1)_nR^2_m$$

(D)

$$H_2N(CH_2)_3Si(OR^1)_nR^2_m, \text{ or}$$

(E)

$$H_2NC_2H_4NH(CH_2)_3Si(OR^1)_nR^2_m$$

where $R^1$ and $R^2$ each are independently an alkyl group having 1-4 carbon atoms, n and m are $1 \leq n \leq 3$ and $m=3-n$ respectively, and/or a partial hydrolyzate thereof, wherein more than 200 parts by weight of the polyurethane resin in terms of the weight of solid matters is used on the basis of 100 parts by weight in terms of the weight of nonvolatile matters of the silicone oil, wherein the polyurethane resin aqueous emulsion is a mixture of (a) an aqueous emulsion containing a hydrazide and a carbonyl group-containing polyurethane resin,

TABLE

| | Example No. | | | | Comp. Ex. No. | | | |
|---|---|---|---|---|---|---|---|---|
| Test items | 1 | 2 | 3 | 4 | 1 | 2 | 3 | 4 |
| Friction coefficient | 0.16 | 0.16 | 0.17 | 0.17 | 0.18 | 0.18 | 0.05 | 2.50 |
| Durability test | ○ | ○ | ○ | ○ | X | X | X | — |
| Non-stickiness test | ○ | ○ | Δ | Δ | ○ | ○ | ○ | X |
| Solvent resistant test | ○ | ○ | X | Δ | Δ | Δ | X | — |
| Bleeding evaluation | ○ | ○ | ○ | ○ | X | X | X | — |
| Pot life test | ○ | ○ | ○ | ○ | ○ | ○ | ○ | — |
| Coatability test | ○ | ○ | ○ | ○ | X | X | X | — |
| Transport characteristics test | | | | | | | | |
| Transport rate (number of O rings/min.) | 100 | 100 | 90 | 80 | 50 | 40 | 60 | 10 |
| Remining O rings (number) | 0 | 0 | 10 | 10 | 100 | 110 | 200 | 300 |
| Overall evaluation | ○ | ○ | Δ | Δ | X | X | X | X | and (b) a silanol-modified polyurethane resin aqueous emulsion wherein the silanol-modified polyurethane resin has, in the polyurethane structure, silanol groups, which turn to siloxane bonds by condensation cross-linking reaction after surface treating, in a ratio by weight of solid matter sum total of (a):(b) is 5-95:95-10.

2. An aqueous surface-treating agent according to claim 1, wherein 10-60 parts by weight of the silane compound and/or a hydrolyzate thereof is used on the basis of 100 parts by weight in terms of nonvolatile matters of the silicone oil.

3. An aqueous surface-treating agent according to claim 1, wherein more than 222.3 parts by weight of the polyurethane resin in terms of the weight of solid matters is used on the basis of 100 parts by weight in terms of the weight of nonvolatile matters of the silicone oil.

4. An aqueous surface-treating agent according to claim 1, for application to the surfaces of rubber materials or resin materials.

5. An aqueous surface-treating agent according to claim 4, wherein the rubber materials are seal materials.

6. A seal material surface-treated by an aqueous surface-treating agent according to claim 5.

7. An aqueous surface-treating agent according to claim 4, wherein the rubber materials are sliding members.

8. A sliding member surface-treated by an aqueous surface-treating agent according to claim 7.

* * * * *